BIDIRECTIONAL DISTRIBUTION SYSTEM
Filed March 2, 1967 2 Sheets-Sheet 1
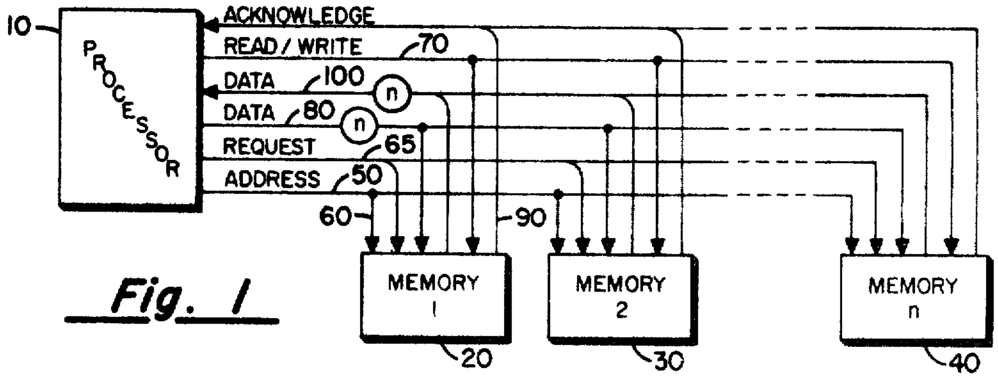
Fig. 1
Fig. 3
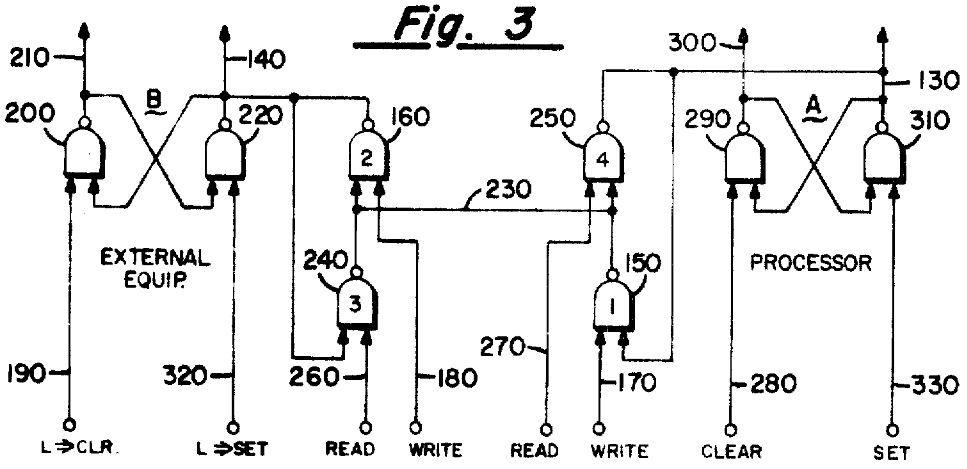
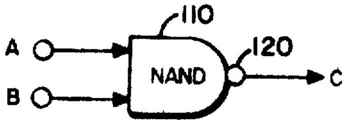
Fig. 2a
| A | B | C |
|---|---|---|
| L | L | H |
| L | H | H |
| H | L | H |
| H | H | L |
Fig. 2b
INVENTOR
*DONALD V. MAGER*
BY Alfred E. Hall
ATTORNEY

INVENTOR
DONALD V. MAGER

BY Alfred E. Hall

ATTORNEY 3,488,634
BIDIRECTIONAL DISTRIBUTION SYSTEM
Donald V. Mager, Minneapolis, Minn., assignor to Sperry Rand Corporation, New York, N.Y., a corporation of Delaware
Filed Mar. 2, 1967, Ser. No. 619,970
Int. Cl. G11b *13/00*
U.S. Cl. 340—172.5 2 Claims

ABSTRACT OF THE DISCLOSURE

A bidirectional transmission system which may be used for the movement of digital information from one location to another in either direction via a single transmission line whereby the number of data lines required between the sending and receiving locations is reduced by at least one-half.

BACKGROUND OF THE INVENTION

Field of the invention

The present invention relates to a data transfer system in which digital data is transferred from one location to another in either direction via a single transmission line.

Description of the prior art

Many systems exist in which it is required that digital data be transferred between two locations in both directions. For instance, a data processor may include a number of bistable devices such as flip-flops which store digital data that has been received from or is to be transmitted to a device at a second location. The device at the second location may be for example, a memory module which also contains bistable devices which store digital data that has been received from or is to be transmitted to the data processor. Obviously, the data processor and the memory module are only two of many devices which must transmit digital data from one of them to the other in either direction.

In the past it has been customary to use a first transmission line to couple the information stored in a bistable device at a first location to a corresponding bistable device at a second location and a second transmission line to reverse the process, i.e. to transfer the digital data stored in the bistable device at the second location to the corresponding bistable device at the first location. The need for separate leads to transfer the digital data in first and second directions has required coupling arrangements employing very large numbers of transmission lines since the data to be transferred may be in the form of "words" which may include a large plurality of bits per word. The greater the number of bits to be transferred simultaneously, the more acute the problem becomes.

SUMMARY OF THE INVENTION

Recognizing the disadvantages of the prior art system which require separate transmission lines for the transfer of data in each direction, applicant's invention is concerned with a data transfer system arranged to appreciably reduce the number of data transmission lines needed between data storage devices at first and second locations. In particular, the data transfer system of the present invention utilizes transmission lines each of which performs the dual function of transferring digital data from a first location to a second location or for transferring the data from the second location to the first location thus reducing the number of transmission lines required by at least one-half.

Thus, it is an object of the present invention to provide a novel circuit which utilizes a single transmission line to transfer digital signals from one location to another in a bi-directional sense.

BRIEF DESCRIPTION OF THE DRAWINGS

These and other more detailed and specific objects and features will be disclosed in the course of the following specification, reference being had to the accompanying drawings, in which:

FIG. 1 is a block diagram of a prior art system showing a single processor controlling a plurality of memory modules;

FIG. 2(*a*) illustrates a circuit element which functions as the building block by which the system may be constructed;

FIG. 2(*b*) shows a truth table which illustrates the input and output conditions of the circuit element in FIG. 2(*a*);

FIG. 3 shows the preferred arrangement of the circuit elements in combination with a single transmission line to form a bidirectional transmission system utilized to transfer digital information from one location to another;

DESCRIPTION OF THE PREFERRED EMBODIMENT

Figure 4:
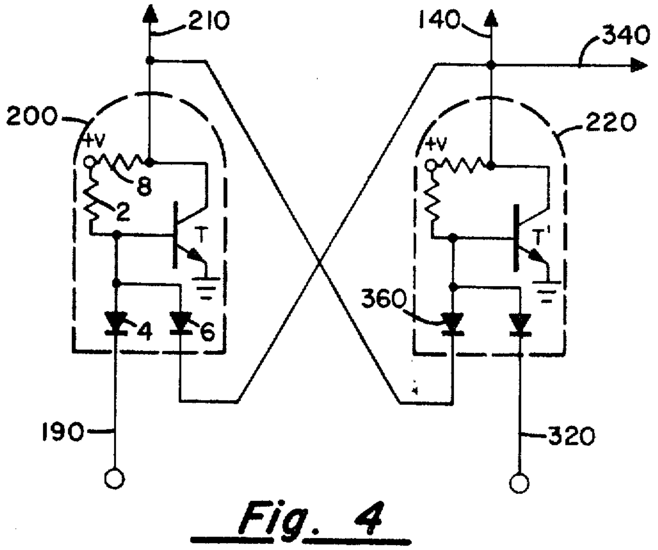
FIG. 4 illustrates the circuit details of one of the bistable storage devices.

Consider the prior art system in FIG. 1 which shows processor 10 communicating with a plurality of memory modules 20, 30 and 40. If it is desired that processor 10 should transmit information on to memory module 20, it would have to place signals representing the desired memory ADDRESS on cable 50, a REQUEST signal on line 60 of cable 65, a WRITE signal on line 70 and the DATA signals on cable 80. Cable 80 may contain any number of individual leads. For example, if the DATA word consists of 30 bits, 30 leads would have to be present in cable 80. When the memory module completes operation on the received data, it places an ACKNOWLEDGE signal on line 90 to notify the processor which can then place another REQUEST on the lines.

If the processor desires to read information from the memory modules, it places a signal representing the desired memory ADDRESS on cable 50, a REQUEST signal on the appropriate line of cable 65 to the selected memory module, and a READ signal on line 70. The memory module then places the DATA on the leads of cable 100.

It is obvious that the ADDRESS signals could be sent over the DATA lines instead of separate lines if sequential operations are used.

It can be seen that to transfer an n-bit DATA word between the processor and a plurality of individual memory modules, the prior art system requires a cable of n-conductors to transmit the DATA in a first direction to the modules and a cable of n-conductors for each memory module to transmit the DATA in a second direction from the modules. The present invention reduces by one-half the number of data lines required between an individual sending and receiving location.

Consider FIG. 2(*a*) which illustrates a circuit element which functions as the building block by which the present inventive system may be constructed. Element 110 is a positive AND gate which has A and B inputs and generates a negated output C. These gates are known as NAND gates. The small circle 120 indicates the negation. The truth table shown in FIG. 2(*b*) indicates that the output, C, is low only if both the inputs A and B are high.

FIG. 3 shows the preferred arrangement of the circuit elements in combination with a single transmission line to form a bi-directional transmission system utilized to transfer digital information from one location to another. Assume that a bistable element storage device such as a multivibrator A is located in a first location such as a processor and that a bistable element storage device such as multivibrator B is located in a second location such as a memory module.

To illustrate the operation of the bidirectional transmission system, assume the storage device A is a stage of a register within the processor and that storage device B is a stage of a register within the external equipment such as the memory module. Assume also that when a storage device is set, a high output occurs from the set-side and when it is clear, a high output occurs from the clear side. To transfer the logical signal at the set-side of storage device A on line 130 to the set-side of storage device B on line 140, the sending gate 150 and the receiving gate 160 would be enabled by the write pulses on lines 170 and 180 respectively. If the set-side of device A were high, then according to the truth table in FIG. 2(*b*), the output of the gate 150 would be low and the output of gate 160 would be high. With the output of gate 160 high and with no signal on line 190 (which looks like a high), gate 200 produces a low output on line 210. This low is coupled to gate 220. As can be seen from the truth table in FIG. 2(*b*), a low input to the element produces a high output. Thus, the high output present at the output of storage device A on line 130 has been transferred via the transmission line 230 to storage device B where it is present at the output of gate 220 on line 140.

To transfer data from the set-side of storage device B to the set-side of the storage device A, the sending gate 240 and the receiving gate 250 would be enabled by the read pulses on lines 260 and 270 respectively. If the set-side of storage device B on line 140 is high, then according to the truth table in FIG. 2(*b*) the output of gate 240 would be low and the output of gate 250 would be high. With the output of gate 250 high and with no signal line 280 (which looks like a high), gate 290 produces a low output on line 300. This low is coupled to gate 310. Again, as can be seen from the truth table in FIG. 2(*b*), low input to the element produces a high output. Thus, the high output present at the output of storage device B on line 140 has been transferred via the transmission line 230 to storage device A where it is present at the output of gate 310 on line 130.

In transferring data from storage device A to storage device B it will readily be seen that if the set-side of storage device A is low, the output of gate 150 will be high, the output of gate 160 will be low, the output of gate 200 will be high and the output of gate 220 (the set-side) will be low. Conversely, in transferring data from storage device B to storage device A, it will be readily seen that if the set-side of storage device B is low, the output of gate 240 will be high, the output of gate 250 will be low, the output of gate 290 will be high and the output of gate 310 (the set-side of storage device A) will be low and, therefore, the same as the set-side of storage device B. Storage devices B and A may be individually set by applying pulses to lines 320 and 330 respectively and may be cleared by applying pulses to lines 190 and 280 respectively.

It should be noted that if the original output of gate 220 were low, a high output from the set-side of storage device A could not be transferred to the set-side of storage device B. The reasons why will be explained later with reference to FIG. 4. For now, however, it should be understood that storage device B should always be set before a transfer is made from storage device A. Then if a high is to be transferred from device A to B, that high is already present at the set-side output of storage device B. If a low is to be transferred from device A to B, storage device B is caused to change states and the low output appears on the set-side of device B. Clearly, the reverse is also true when transferring data from device B and A. Device A should be first set.

FIG. 4 illustrates the details of one of the bistable storage devices. Since both gates of the storage device are identical, only one will be discussed in detail. Like numerals indicate like components in FIG. 3 and FIG. 4. The base of transistor T in gate 200 is connected to the power supply, +V, via resistor 2 and is also connected to the anodes of diodes 4 and 6. The collector of transistor T is connected directly to output line 210 as well as to the power supply, +V, via resistor 8. The emitter of transistor T is connected to ground. It will readily be seen that if a high potential is connected to the cathodes of both the diodes, they will be reversed biased and cannot conduct. When this happens, the full supply voltage, +V, is applied to the base of transistor T causing it to conduct. When transistor T conducts, the power supply voltage is dropped across resistor 8 and thus a low is present on output line 210. If either of the inputs to diodes 4 to 6 is a low, that diode conducts and the power supply voltage is dropped across resistor 2 causing low voltage to be applied to the base of transistor T which shuts it off or causes it to cease conduction. When it ceases conduction, the power supply voltage is no longer dropped across resistor 8 and a high appears at the output of gate 200 on line 310.

It will be noted that if transistor T′ in gate 220 is conducting, any high signal that is attempted to be placed on terminal 340 will be forced to go low because of the ground on emitter of transistor T′. It is for this reason that a high signal from a first storage device at a remote location cannot be transfererd to a second storage device unless the second storage device has been set ot cause a high output on the set side.

Assuming then that a high signal is initially present on line 140 and a low is placed on terminal 340 from the remote location and is to be stored as a low at the output of gate 220, it will be seen that the low at terminal 340 causes diode 6 in gate 200 to conduct. The power supply voltage is dropped across resistor 2 which applies a low voltage to the base of transistor T causing it to cease conducting. The power supply voltage is then present as a high at the output of gate 200 on line 210. This high is coupled to gate 220 where diode 360 is reverse biased. Since no input is applied to the other input of gate 220 on line 320 the other diode acts as if it were reverse biased with a high applied to it. The full power supply voltage is then applied to transistor T′ and it conducts. The power supply voltage is then dropped across the collector resistor causing a low signal to be present at the output of gate 220 on line 140.

Figure 5:
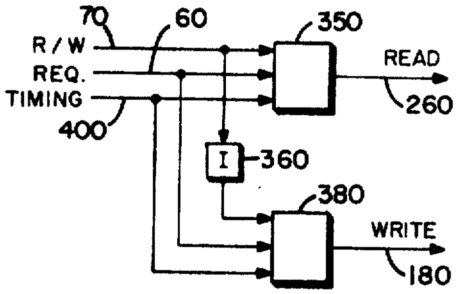
FIG. 5 shows the circuitry which illustrates how control signals are developed in each remote device such as a memory module.

There are many ways in which the read/write control signals needed at the remote location could be generated. One way is shown in FIG. 5 and is shown for purposes of example only. The READ signal on line 260 in FIG. 3 and the WRITE signal on line 180 represents the WRITE signal on line 180 in FIG. 3. Assume that a READ signal on line 70 both in FIG. 1 and FIG. 5 is represented by a high signal and a WRITE signal is represented by a low signal. AND gate 350 will then produce an output signal representing a READ signal on line 260 if it has as inputs a high signal on line 70 (representing a READ signal), a REQUEST signal on line 60 and an appropriate timing signal on line 400 representing that the receiving equipment at the remote location has completed any previous operations.

If a WRITE signal is placed on line 70, it will be seen that inverter 360 will produce an output signal that is coupled to AND gate 380 along with the other two signals discussed above. These signals cause AND gate 380 to produce a WRITE signal on line 180 which is used in the manner discussed in relation to the invention shown in FIG. 3.

Figure 6:
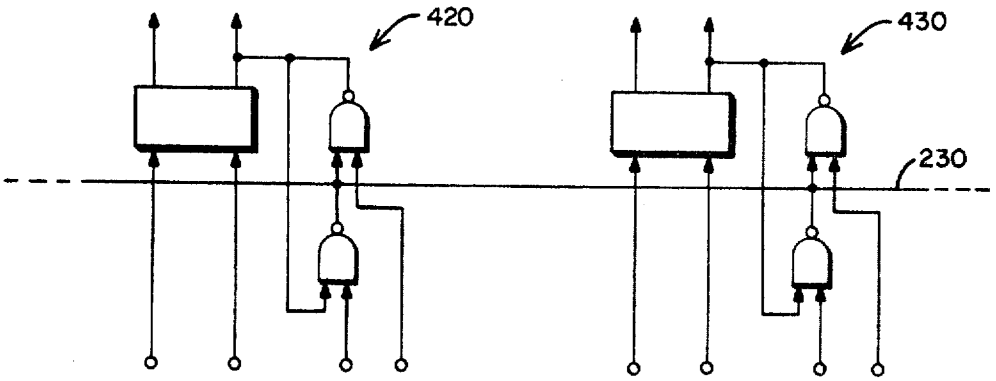
FIG. 6 shows how a plurality of bistable stages may be coupled to a single transmission line.

From FIG. 6, it will be seen that a plurality of additional bistable stages such as stages 420 and 430 may be coupled in parallel with stage B in FIG. 3 to transmission line 230. Obviously any one of stages B, 420 or 430 may be selected by the appropriate request signal which can be generated by any of the well-known priority selector networks or by separate request lines. As shown in FIG. 5 the request signal would then be used to generate the read or write signals for the selected stage.

While the invention has been described in relation to the transfer of digital data signals between a data processor and a memory module, it will be noted that the invention is not limited to this specific application but is applicable to any situation involving a bidirectional movement of digital information from one location to another.

I claim:

1. A bidirectional digital data distribution system comprising:

(a) a first bistable stage,
(b) a second bistable stage,
(c) first, second, third and fourth NAND gates,
(d) a signal conductor coupling the output of said first gate to the input of said second gate and the output of said third gate to the input of said fourth gate,
(e) means coupling one output of said first bistable stage to the input of said first gate and the output of said fourth gate, and (f) means coupling one output of said second bistable stage to the input of said third gate and to the output of said second gate whereby data may be transferred from said first stage to said second stage via said first and second gates and from said second stage to said first stage via said third and fourth gates.

2. A bi-directional digital data distribution system comprising:

(a) a first bistable stage,
(b) a second bistable stage,
(c) a single conductor transmission line,
(d) first and second NAND gates each coupled to a respective end of said transmission line for transferring data from said first stage to said second stage, and
(e) third and fourth NAND gates each coupled to a respective end of said transmission line for transferring data from said second stage to said first stage.

References Cited

UNITED STATES PATENTS

| | | | |
|---|---|---|---|
| 3,140,472 | 7/1964 | Adams et al. | 340—174 |
| 3,247,323 | 4/1966 | Carroll | 179—15 |
| 3,170,038 | 2/1965 | Johnson et al. | 178—71 |

GARETH D. SHAW, Primary Examiner

R. F. CHAPURAN, Assistant Examiner